Sept. 21, 1954  K. A. DOUTT  2,689,482
MECHANICAL MOVEMENT FOR FLASH WELDING MACHINES
Filed Dec. 13, 1951  4 Sheets-Sheet 1

FIG-1-

INVENTOR.
Kingsley A. Doutt.
BY
W. B. Harpman
ATTORNEY.

Sept. 21, 1954 K. A. DOUTT 2,689,482
MECHANICAL MOVEMENT FOR FLASH WELDING MACHINES
Filed Dec. 13, 1951 4 Sheets-Sheet 3

INVENTOR.
Kingsley A. Doutt.
BY
W. B. Harpman
ATTORNEY.

Sept. 21, 1954      K. A. DOUTT      2,689,482
MECHANICAL MOVEMENT FOR FLASH WELDING MACHINES
Filed Dec. 13, 1951      4 Sheets-Sheet 4
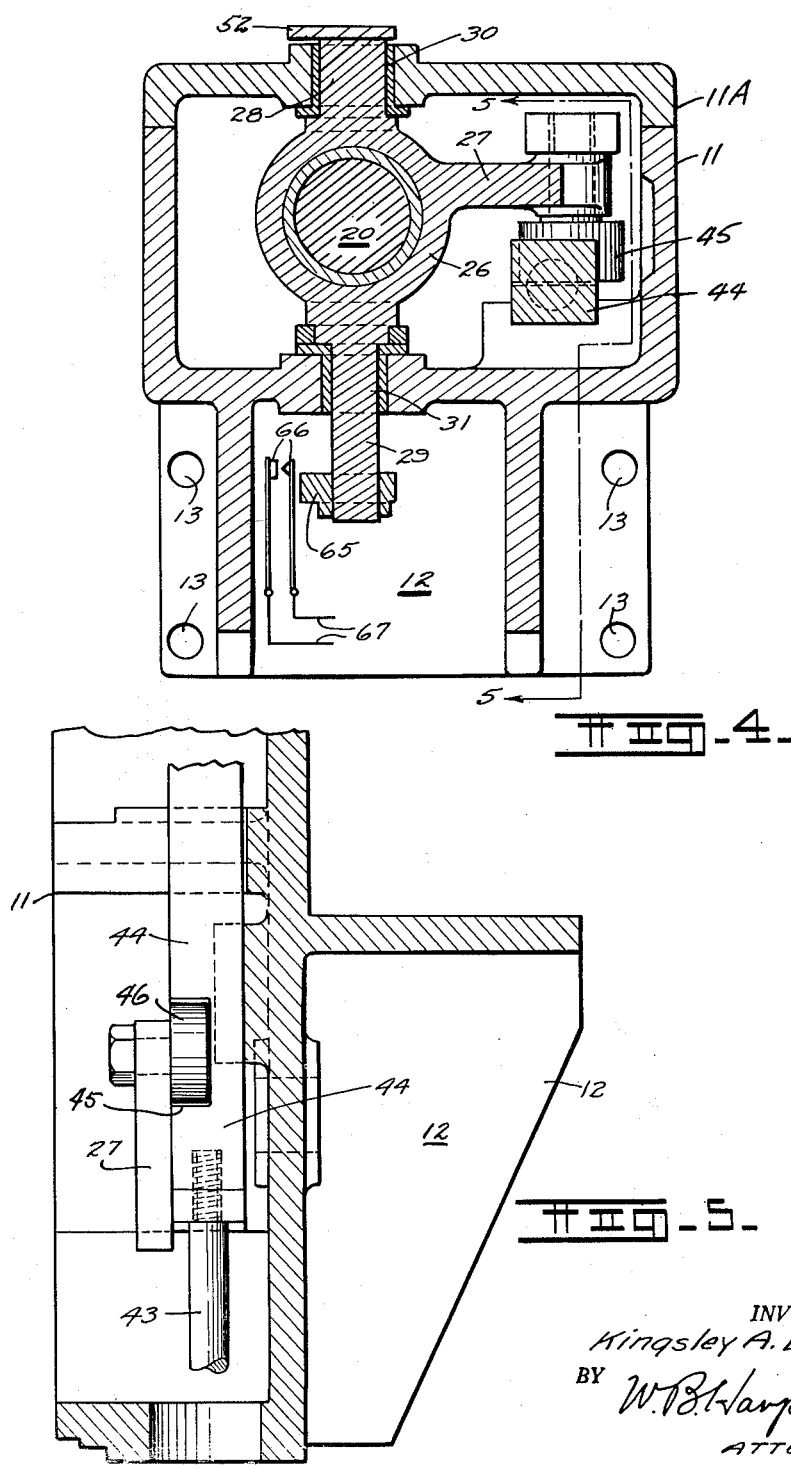
INVENTOR.
Kingsley A. Doutt.
BY
ATTORNEY.

Patented Sept. 21, 1954

2,689,482

UNITED STATES PATENT OFFICE 2,689,482

MECHANICAL MOVEMENT FOR FLASH WELDING MACHINES

Kingsley A. Doutt, Detroit, Mich.

Application December 13, 1951, Serial No. 261,553

6 Claims. (Cl. 74—99)

This invention relates to a mechanical movement and more particularly to a mechanical movement for imparting controlled motion to the movable platen of a flash welding machine.

Flash welding machines as known in the art comprise essentially an insulated normally fixed platen having an electrode and means to secure a workpiece thereto. A movable platen is also provided and includes an electrode and workpiece securing means. The movable platen is arranged for sliding movement toward and away from the fixed platen and means is provided for imparting such movement thereto.

In the present disclosure a simple mechanical arrangement including a pivoted rocker arm including a cam carrying slide piece is arranged to receive uniform movement from a power source and transform such movement to a suitable platen motion for operating a flash welding machine.

In order that a controlled motion may be imparted to the movable platen of a flash welder machine, various types of platen moving apparatus have been devised, the majority of which have comprised hydraulically actuated devices wherein various valves and valve controlling means are utilized to increase the flow of hydraulic fluid to a hydraulic cylinder. Such devices have generally had in common a mechanical connection with the movable platen of the flash welding machine so that the devices controlling and moving the movable platen were in turn controlled by the position of the movable platen itself and/or the speed of travel thereof.

Those skilled in the art are aware that an improved welding technique will result from a desirably controlled and timed flash welding operation and it is, therefore, a principal object of this invention to provide a mechanical movement operating to impart a most desirable welding cycle movement and control to the movable platen of the flash welding machine regardless of the conditions effecting the movable platen and variations in the workpieces as to size, thickness, material, shape, etc.

A further object of the invention is the provision of a mechanical movement for a flash welding machine arranged to perform a complete welding cycle from flashing to upsetting with no hesitation in the controlled and timed advance of the movable platen and operating in effect to superimpose upsetting action on a continuing flashing action.

A still further object of the invention is the provision of a mechanical movement for imparting controlled motion to the movable platen of a flash welding machine and which apparatus produces a flashing cycle in accordance with its preset controls and superimposes an upset cycle on the flashing cycle, the movement of the platen during the flashing and upset cycles being responsive only to the apparatus.

A still further object of the invention is the attainment of a wider diversity and greater accuracy in the control of the variables making up a flash welding operation through the use of an improved mechanical movement. For example, the pattern of the rate of change of the movable platen during the flashing action may be readily varied with respect to time and the interval between the initiation of flashing and the start of the upsetting. Such variable factors enable a much higher degree of control over the welding operation to be achieved and thereby contribute substantially to the quality of the work performed.

A still further object of the invention is the provision of a mechanical movement capable of acting as a welded control which facilitates and simplifies the setting up of the welding machine to perform a particular welding operation especially when the operation is to be repeated under automatic control. The invention, therefore, comprises a mechanical movement for readily changing the pattern of movement of the movable platen during the flashing and upsetting portions of the welding cycle, the device being so arranged that regardless of the adjustments made, a complete cycling of the flash welding machine always occurs.

A still further object of the invention is the provision of a mechanical movement for a flash welding machine which will impart immediate and smooth action to the movable platen of the flashing welding machine and continue such smooth progressive movement of the movable platen in accordance with a predetermined flashing and upsetting cycle whether or not the movable platen is dry or lubricated and regardless of the weight, shape, material or other characteristics of the workpiece to the end that a perfect flash weld is obtained.

A still further object of the invention is the provision of a mechanical movement acting as a flash welding control mechanism for a flash welding machine which may be simply and economically formed and which may be employed with any flash welding machine to operate the same effectively and which apparatus may be made at relatively low cost and hence sold at relatively low cost as compared with other flash welding machine controls heretofore known in the art.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 4 is a transverse section taken on line 4—4 of Figure 1.

Figure 5 is a detailed elevation of a portion of the apparatus shown in Figure 4 and taken on line 5—5 thereof.

Figure 1:
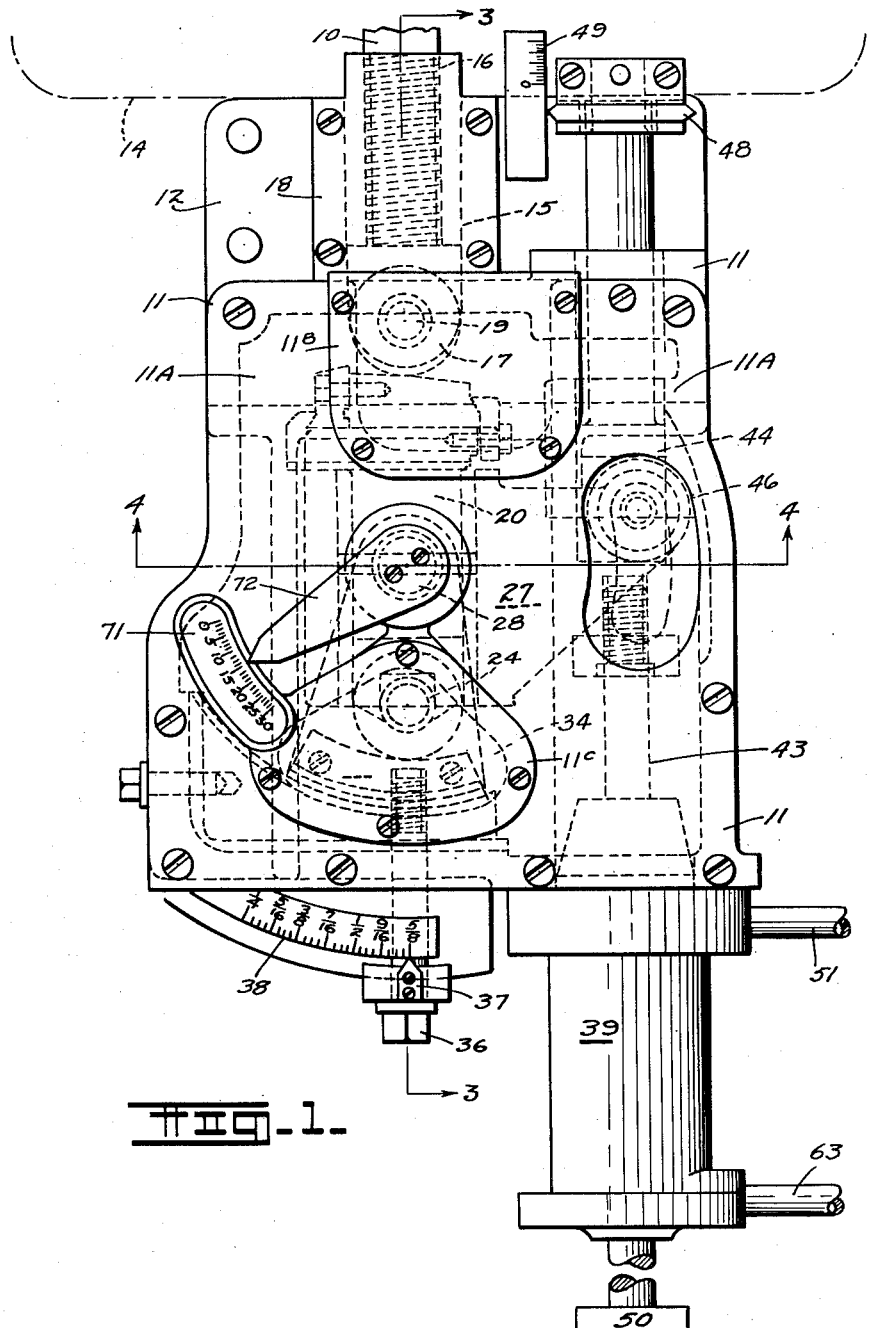
Figure 1 is a top plan view of the improved flash welder controlling mechanical movement.

By referring to the drawings and Figure 1 in particular it will be seen that the flash welding controlling mechanical movement comprises a relatively small and compact device which may be attached to a flash welding machine by bolting the same thereto at a point thereon adjacent the movable platen and connecting the movable platen thereto as shown in Figure 1 of the drawings by a connecting member 10. The device comprises a frame 11, the major portion of which is formed as a housing and with a portion 12 thereof shaped as a mounting bracket, as best seen in Figure 4 of the drawings. The mounting bracket 12 is provided with a plurality of openings 13 so that it may be bolted to the flash welding machine. In position on the flash welding machine, the device will appear in top plan view, as in Figure 1 of the drawings, with its connection to the flash welding machine at the upper portion of Figure 1, the flash welding machine being generally represented by the dotted lines carrying the numerals 14.

The portion of the mechanical movement that engages the movable platen of the flash welding machine comprises a roller slide 15 which has a threaded socket 16 longitudinally thereof in which the member 10 from the movable platen of the flash welder is engaged. The roller slide 15 has a roller 17 on its innermost end and is reciprocally positioned in a guide-like extension 18 of the frame 11 extending over the bracket-like portion 12 thereof. The roller 17 is secured between bifurcated end extensions of the roller slide 15 by a pin 19. Positioned in longitudinal alignment with the roller slide 15 there is a cam and roller slide 20 having a two-part cam 21 and 22 positioned in the end thereof adjacent the roller 17 and secured to the cam and roller slide 20 by a clamp 23.

A secondary roller 24 is positioned in the opposite end of the cam and roller slide 20 between bifurcated extensions thereof and by a pin 25. These essential operating parts of the apparatus may be seen in the schematic view comprising Figure 2 of the drawings in which only the working parts of the device are disclosed and in which the housing, mounting brackets, etc., are omitted.

The cam and roller slide 20 is mounted for reciprocal movement longitudinally of the device in a slide housing 26 (see Figure 4) which has a rocker arm 27 formed integrally therewith and extending sidewardly with respect thereto. Additionally, the slide housing 26 has a pair of oppositely disposed projecting stub shafts 28 and 29 which are journaled in vertically aligned openings 30 and 31, respectively, in the frame 11. It will thus be observed that when motion is imparted to the slide housing 26 by means of the rocker arm 27 thereof to cause the same to pivot on its vertical axis through the projecting stub shafts 28 and 29, the two-part cam 21 and 22 will engage the roller 17 and impart longitudinal movement to the roller slide 15 and hence to the movable platen of the flash welder.

A secondary cam 32 is positioned on an arcuate guide 33 which in turn is mounted in the frame 11 and is retained in position on the arcuate guide 33 by a strap 34 which is pivoted about the projecting stub shaft 29. The secondary cam 32 is adjustably positioned on the arcuate guide 33 by means of a cap screw 35 which extends outwardly through a slot 36 in the frame 11 and is provided adjacent its outermost end with a pointer 37 registering with a scale 38. It will thus be seen that the secondary cam 32 may be moved along the arcuate frame 33 by the cap screw 36 and it will also be observed that the secondary roller 24 on the cam and roller slide 20 will engage the secondary cam 32 when the slide housing 26 is partially rotated on its vertical axis through the stub shafts 28 and 29 heretofore referred to.

It will thus be seen that a variable non-uniform movement is imparted to the roller slide 15 from the combined action of the cams 21 and 32. The variable non-uniform movement results from two sources; first the engagement of the secondary roller 24 against the cam 32 resulting from such engagement moves the cam and roller slide 20 longitudinally in the slide housing 26 and in turn moves the two-part cam 21 and 22 toward the roller 17 which is normally engaged thereagainst. The two-part cam 21 and 22 is also adding movement to the cam and roller slide 15 as it is moving in a different transverse direction with respect to the roller 17 as it is on the opposite side of the vertical axis of the slide housing 26.

In actual operation the secondary roller 24 initially engages the cam 32 and provides a progressively increasing flashing travel of the movable platen. The movement of the roller 17 engaging the two-part cam 21 and 22 is superimposed upon this initial movement and comprises the upset cycle motion imparted to the flash welder.

It will be obvious to those skilled in the art that several different mechanical means may be used to impart the rocking motion to the arm 27 necessary to the operation of the device.

In the preferred embodiment of the device as illustrated herein a hydraulic cylinder 39 is connected with a suitable source of hydraulic fluid such as a pump 40 and with suitable control valves such as 41 and 42 and is positioned adjacent the outermost end of the frame 11 and with its piston rod 43 on a parallel plane with respect to the roller slide 15 heretofore referred to. The piston rod 43 has a squared section 44 therein with a transverse slot 45 thereacross. A roller 46 is positioned in the slot 45 and secured by means of a pin 47 to the rocker arm 27 as best shown in Figures 4 and 5 of the drawings. It will thus be seen that when the piston rod 43 moves longitudinally the roller 46 will impart comparable movement to the rocker arm 27 and hence the slide housing 26 to operate the device as hereinbefore described.

The piston rod 43 extends beyond the squared section 44 and has a nut and pointer 48 thereon for registry with a scale 49 indicating the degree of upset travel imparted the flash welding machine. The upset travel is directly controlled by the positioning of the nut and pointer 48 with respect to the rod 43. In normal platen open position, the nut and pointer 48 will register with the zero mark on the scale 49, the rocker arm 27 will be at its maximum point of travel away from the hydraulic cylinder 39 and the two-part cam 21 and 22 and the secondary cam 32 will therefore have their lowest surfaces engaging the rollers 17 and 24, respectively, which will permit the cam and roller slide 20 and the roller slide 15 to be in maximum retracted position with respect to the device. When the nut and pointer 48 is moved on the rod 43 toward the hydraulic cylinder 39, the degree of upset travel is lessened as the movement stops when the nut and pointer 48 bottoms on the frame 11. An adjustment nut 50 is positioned on the other end of the rod 43 to limit movement in the opposite direction in the same manner.

Figure 2:
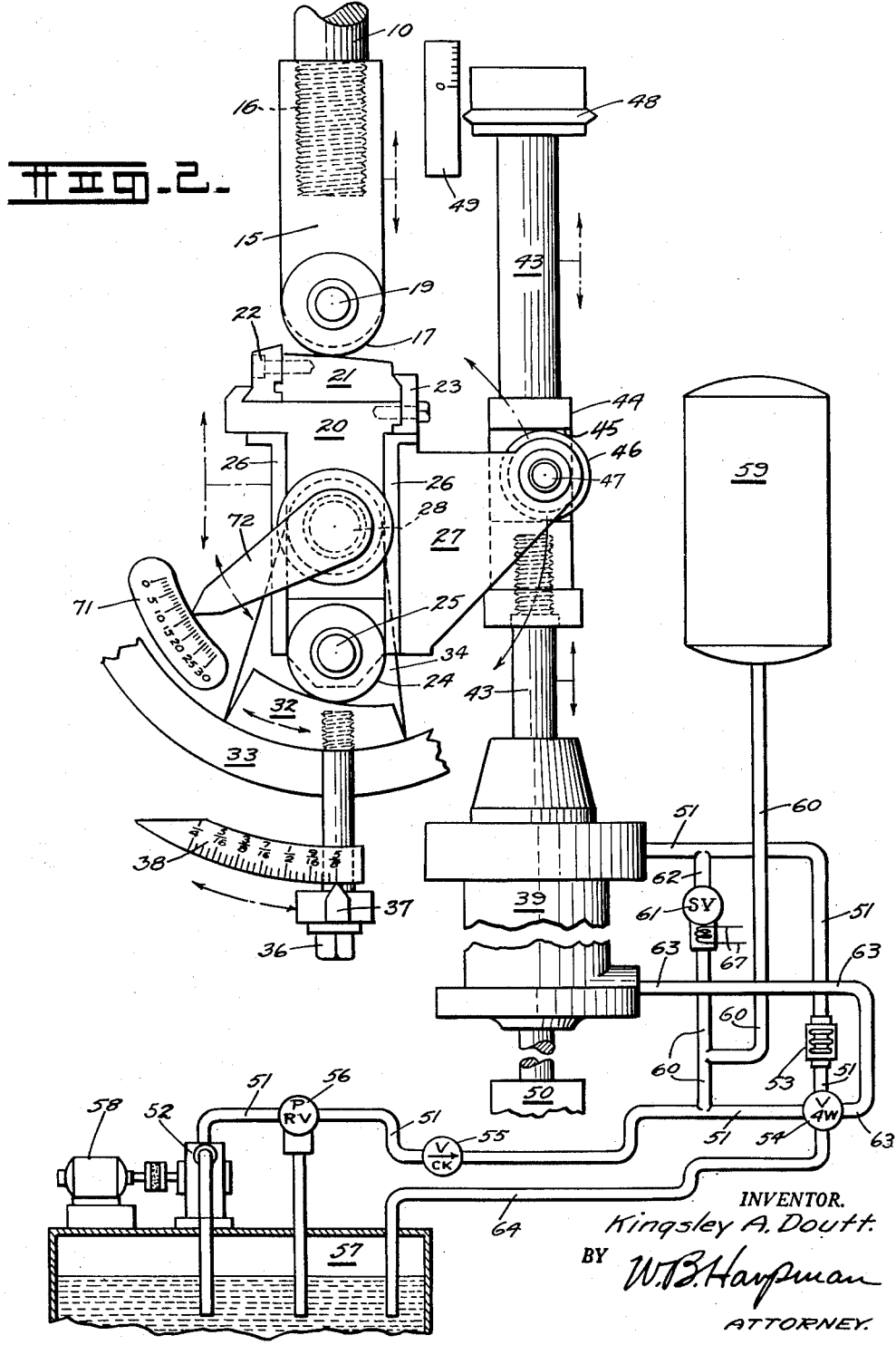
Figure 2 is a diagrammatic arrangement of the flash welding apparatus showing the moving parts thereof.

At such time as the hydraulic cylinder 39 is energized it moves the piston rod 43 from top to bottom, as seen in Figures 1 and 2 of the drawings, moving the pin 47 toward the hydraulic cylinder 39 and hence imparting movement to the rocker arm 27 and the housing 26 which causes the secondary roller 24 to progressively engage the secondary cam 32 in a clockwise direction while the two-part cam 21 and 22 engages the roller 17 in a similar clockwise direction. The resulting compounded movement of the cam and roller slide 20 and the roller slide 15 is directly imparted to the movable platen of the flash welding machine and results in the desirable flash welding cycle thereof.

In order that the cam travel of the device can be determined in degrees, a scale 71 is positioned on the frame 11 and a pointer 72 secured to the stub shaft projection 28, as best seen in Figures 1 and 4 of the drawings. It will occur to those skilled in the art that the flashing travel of the platen may be varied by moving the cap screw 36 and hence the secondary cam 32 along the arcuate guide 33. Under such conditions, the flashing cycle motion imparted to the cam and roller slide 20 will vary depending upon the position of the secondary cam 32. The resultant motion imparted the movable platen of the flash welding machine will also vary in direct degree. The two-part cam 21 and 22 will uniformly engage the roller 17 on the roller slide 15 and will provide the upset motion at the proper time regardless of the length of the flashing cycle as determined by the positioning of the secondary cam 32.

It will thus be seen that a desirable flashing and upsetting cycle motion may be imparted to the movable platen of the flash welding machine by the device herein disclosed and that the device is responsive only to itself in determining and carrying out the desired movement of the movable platen.

It will occur to those skilled in the art that the hydraulic actuating means comprising the cylinder 39 disclosed herein may be arranged to impart a predetermined controlled movement to the rocker arm 27 of the device, which movement may be uniform as heretofore described or may alternately be accelerated at a predetermined point to supplement the movement of the upsetting action of the two-part cam 21 and 22.

By referring to Figure 2 of the drawings a schematic elevation of a power supply for the hydraulic cylinder 39 may be seen and it will be observed that a hydraulic supply line 51 extends from the hydraulic cylinder 39 to a pump 52 by way of a flow control valve 53, a four-way valve 54, a control valve 55 and a relief valve 56. The pump 52 communicates with a reservoir 57 and is driven by a motor 58. An accumulator 59 is connected with the hydraulic supply line 51 by a line 60 which also leads to a solenoid valve 61. The solenoid valve 61 is also in communication with the supply line 51 by way of a connecting line 62 which completes a by-pass around the flow control valve 53. A line 63 connects the opposite side of the hydraulic cylinder 39 with the four-way valve 54 and a drain line 64 also connects the four-way valve with the reservoir 57.

In normal operation the solenoid valve 61 is closed and operation of the pump 52 moves hydraulic fluid through the line 51 including the four-way valve 54 and the flow control valve 53 to the hydraulic cylinder 39. At such time as the slide housing 26 reaches predetermined position and the roller 17 and engages the part 22 of the two-part cam, a cam 65 on the stub shaft extension 29, as shown in Figure 4 of the drawings, engages a switch 66 and closes the same which in turn controls the solenoid valve 61 by way of circuit wires 67.

Upon the actuation of the solenoid valve 61, the hydraulic pressure in the accumulator 59 and the direct output of the pump 52 flows by way of the lines 60 and 62 directly into the line 52 adjacent the cylinder 39 and accelerates the motion of the piston rod 43 providing an additive motion with respect to the engagement of the roller 17 on the upset portion 22 of the two-part cam 21 and 22 thereby facilitating the upset action and providing a perfect weld.

Those skilled in the art will recognize that means is provided in the flash welder operated by the device for returning the several parts to their normal position from whence the device may recycle to complete another welding and upsetting action.

Figure 3:
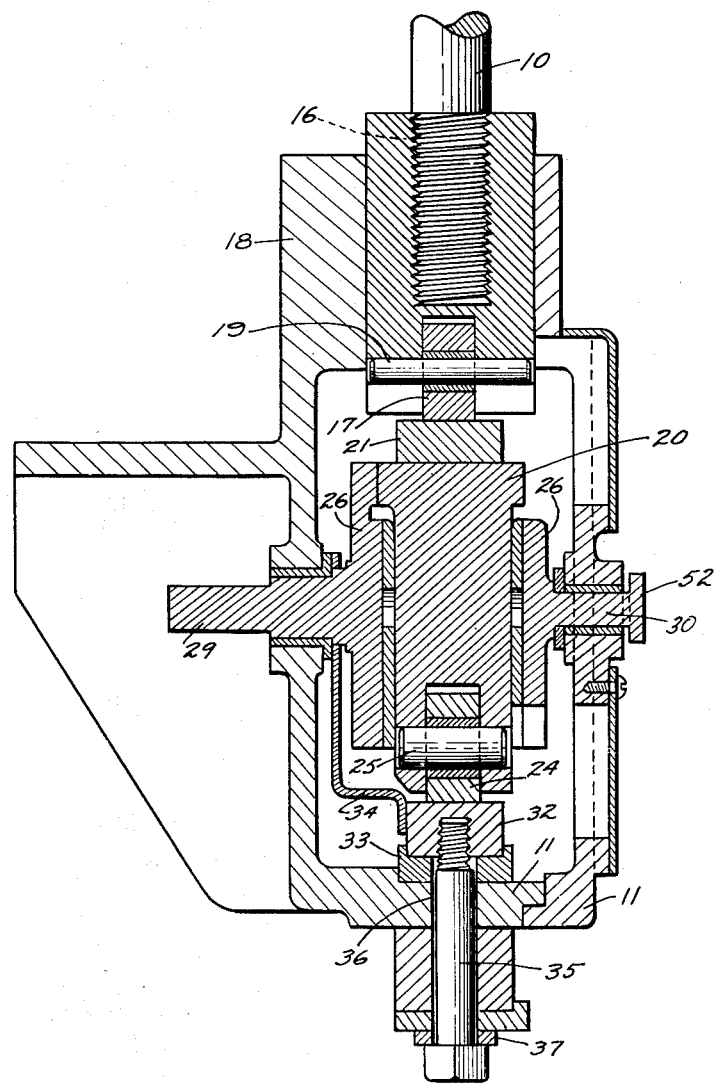
Figure 3 is a vertical section taken on line 3—3 of Figure 1.

By referring again to Figures 1, 3 and 4 of the drawings it will be observed that the frame 11 forms the bottom and side walls of a housing with respect to the slide housing 26 and rocker arm 27 thereof and that a closure 11A forms the top of the enclosure. The openings 30 and 31 heretofore referred to as forming the pivotal bearings of the slide housing 26 are formed one in the closure 11A and one in the bottom of the frame 11 in vertical alignment. It will further be observed that the closure 11A has several access ports therein which are provided with covers 11B and 11C, respectively.

It will further occur to those skilled in the art that the flash welder may be reset for various types of workpieces easily and efficiently by the simple manual adjustment nut 50 and the cap screw 36 with respect to the flashing travel scale 38. Such adjustments enable many and various proportionate flashing and upset periods of a welding cycle to be achieved.

It will thus be seen that the several objects of the invention have been met by the flash welder control disclosed herein.

Having thus described my invention, what I claim is:

1. A mechanical movement comprising in combination a roller slide, a roller on said slide, a slide housing positioned endwise with respect thereto and having a cam and roller slide reciprocally positioned therein and having a cam on one end engaging said roller slide, a secondary roller on the other end of said cam and roller slide, an arcuate guide positioned adjacent thereto and a secondary cam movably positioned on said arcuate guide for engagement with said secondary roller, means for pivoting said slide housing substantially midway between its ends to move said secondary roller against said secondary cam and to move said cam against said roller.

2. The mechanical movement set forth in claim 1 wherein the means for pivoting said slide housing comprises a rocker arm extending at right angles with respect thereto.

3. The mechanical movement set forth in claim 1 and wherein the secondary cam is pivotally mounted on an axis common with the pivotal axis of said slide housing.

4. The mechanical movement set forth in claim 1 and wherein the secondary cam is movable longitudinally of said arcuate guide.

5. The mechanical movement set forth in claim 1 and wherein a lever is affixed to said secondary cam and extends outwardly with respect thereto and wherein said secondary cam is movable longitudinally on said arcuate guide by said lever.

6. The mechanical movement set forth in claim 1 and wherein a hydraulic piston and cylinder assembly is operatively connected to said slide housing for pivoting the same.

References Cited in the file of this patent

UNITED STATES PATENTS

| Number | Name | Date |
|---|---|---|
| 1,872,793 | Nilson | Aug. 23, 1932 |
| 2,085,049 | Spire | June 29, 1937 |
| 2,310,556 | Strong | Feb. 9, 1943 |